United States Patent
Lebas

(10) Patent No.: US 7,631,836 B2
(45) Date of Patent: Dec. 15, 2009

(54) JET ENGINE NACELLE FOR A SUPERSONIC AIRCRAFT

(75) Inventor: Guillaume Lebas, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/133,326

(22) Filed: May 20, 2005

(65) Prior Publication Data

US 2005/0258307 A1    Nov. 24, 2005

(30) Foreign Application Priority Data

May 24, 2004    (FR) .................................. 04 05557

(51) Int. Cl.
B64D 33/02    (2006.01)
(52) U.S. Cl. ..................... 244/53 B; 137/15.1
(58) Field of Classification Search .............. 244/53 B, 244/73 R, 53 R, 62; 137/15.1, 15.2
See application file for complete search history.

(56) References Cited

U.S. PATENT DOCUMENTS

| | | | | |
|---|---|---|---|---|
| 3,141,300 A | * | 7/1964 | Turcat .................. 73/178 R |
| 3,347,496 A | * | 10/1967 | Opfer, Jr. ................. 244/53 B |
| 3,941,336 A | * | 3/1976 | Nangia ...................... 244/53 B |
| 5,005,782 A | * | 4/1991 | Falempin et al. .......... 244/53 B |
| 5,934,607 A | | 8/1999 | Rising et al. | |
| 6,793,175 B1 | * | 9/2004 | Sanders et al. ............ 244/53 B |
| 2002/0096598 A1 | | 7/2002 | Nelson | |

OTHER PUBLICATIONS

Preliminary Search Report dated Jan. 6, 2005.
"Boeing Model Reveals Details," Flight International, Reed Business Information, Haywards Heath, GB, vol. 159, No. 4786, Jun. 26, 2001, p. 15, XP001039275, ISSN: 0015-3710.
R. H. Tindell; "Inlet Drag and Stability Considerations for $M_0$=2.00 Design," AIAA/SAE/ASME/ASEE Joint Propulsion Conference and Exhibit, XX, XX, Jun. 1980, XP000998247, 11 pages.

* cited by examiner

*Primary Examiner*—Tien Dinh
(74) *Attorney, Agent, or Firm*—Dickinson Wright PLLC

(57) ABSTRACT

A jet engine nacelle for a supersonic aircraft may include an air inlet structure that has an inlet face with an elliptical conical cross section. The elliptical conical cross section is defined by the intersection of a conical shock wave generated by a conical compression ramp and a first plane. The first plane is inclined with respect to a second plane that is orthogonal to a longitudinal general direction of the nacelle so that the free side of the inlet face is set back, in the air inlet direction, with respect to the opposite side intended to face the aircraft.

9 Claims, 3 Drawing Sheets

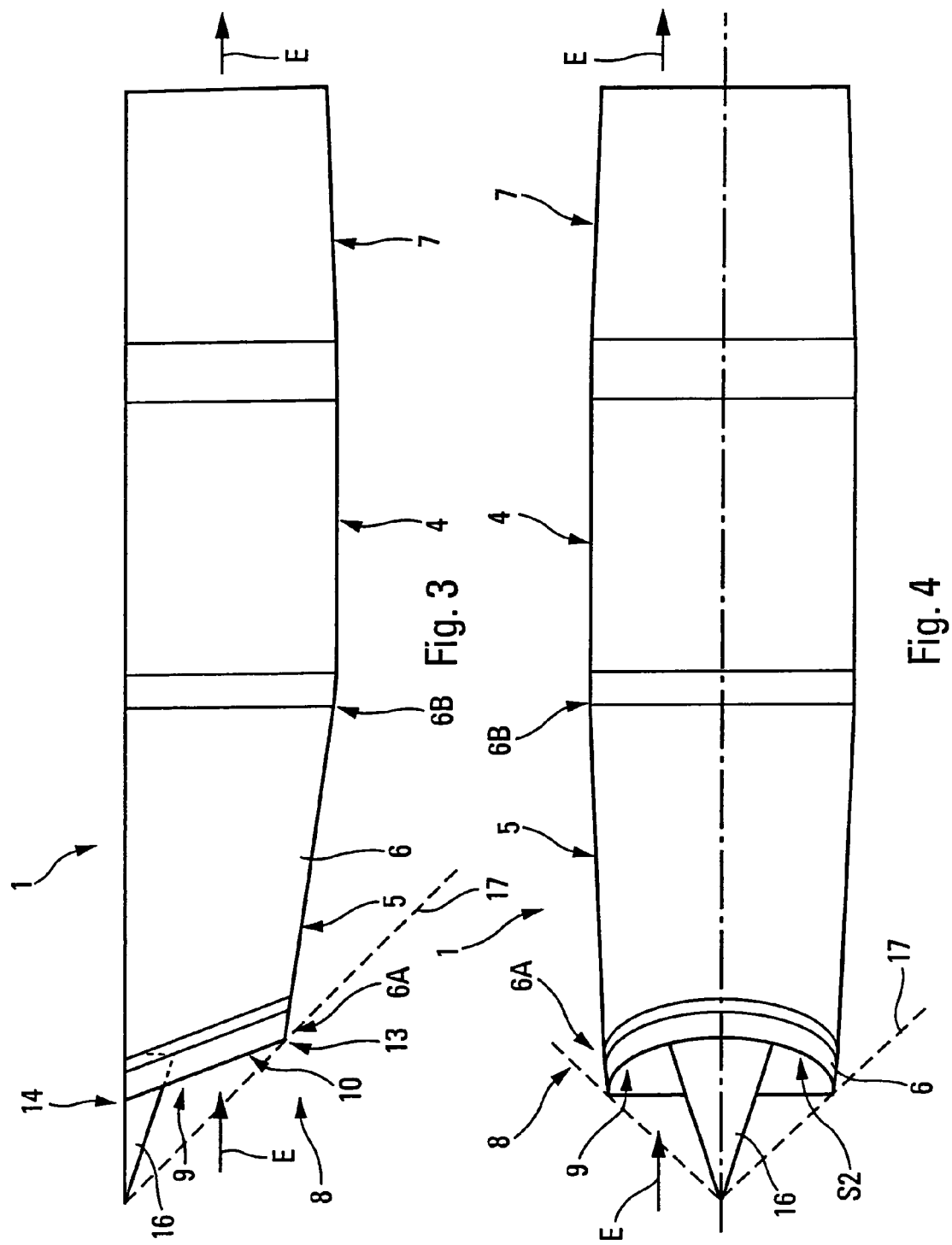

US 7,631,836 B2

JET ENGINE NACELLE FOR A SUPERSONIC AIRCRAFT

FIELD OF THE INVENTION

The present invention relates to a jet engine nacelle for a supersonic aircraft, which is intended to be mounted directly under the airfoil or on the fuselage of the aircraft.

BACKGROUND OF THE RELATED ART

It is known that such a nacelle generally comprises, upstream in the air inlet direction, an air inlet structure, the essential role of which on a supersonic aircraft is to transform the upstream air flow, which is supersonic and close to the cruising Mach number of the aircraft, into a flow that can enter via the fan of the jet engine mounted in the nacelle, i.e. in general at a Mach number of the order of 0.4 to 0.6. This air flow must be as homogeneous as possible in space (low distortion) and undergo the least total pressure drop (efficiency) on passing through said air inlet structure. Moreover, the nacelle must remain operational and stable, despite the variations in flowrate that may have various origins (variations in upstream Mach number, in temperature, in local angle of incidence, etc.) and variations in flowrate at the downstream face (due to variations in the engine output for example).

SUMMARY OF THE INVENTION

The present invention relates to a jet engine nacelle for a supersonic aircraft, which exhibits improved performance in particular in supersonic flight, especially with a reduction in drag.

For this purpose, according to the invention, said jet engine nacelle, which is intended to be mounted directly under the airfoil or on the fuselage of the aircraft and which comprises, upstream in the air inlet direction, an air inlet structure provided upstream with an inlet face, is noteworthy in that said inlet face of the air inlet structure exhibits an elliptical conical cross section, defined by the intersection of a conical shock wave generated by a conical compression ramp and of a first plane which is inclined with respect to a second plane orthogonal to a longitudinal general direction of the nacelle so that the free side of said inlet face is set back, in the air inlet direction, with respect to the opposite side intended to face the airfoil or the fuselage of the aircraft.

Thus, by virtue of this characteristic (upstream inlet face with elliptical cross section), it is possible to increase the length of the inlet face and to reduce its width (with respect to a circular or semicircular inlet face in particular) in such a way as to adapt it to the cross section of the downstream face of said air inlet structure (which will be situated facing a jet engine fan, as specified hereinbelow), thereby making it possible to reduce the disturbance to the air flow through said air inlet structure between its upstream and downstream faces. Thus, the quality of the air stream passing through the air inlet structure is improved, as is the stability of the latter, and the drag of the nacelle is reduced.

It will furthermore be noted that at reduced speed (at subsonic speed in particular), the area of the inlet face to be taken into account in respect of the air stream is the actual area. Now, with an inlet face with elliptical cross section in accordance with the invention, when the frontal area (that is to say parallel to said aforementioned second plane or orthogonal to the general plane of the airfoil) of this inlet face is similar to that of a semicircular or circular inlet face for example, its actual area is higher, this being beneficial for the behavior of the air inlet structure during a flight at reduced speed so as to satisfy control commands for the jet engine.

Advantageously, said first plane is inclined with respect to said second plane by an angle of inclination which lies between 50° and 30°. Preferably, said angle of inclination is substantially equal to 20.6°.

In a preferred embodiment, said air inlet structure exhibits a shape making it possible to go from an elliptical conical cross section to a particular cross section, U shaped, defined on the basis of an arc of a circle of radius dependent on a predetermined length of radius, namely the length of the radius of the fan of the jet engine which will be mounted in said nacelle.

BRIEF DESCRIPTION OF THE DRAWINGS

The figures of the appended drawing will elucidate the manner in which the invention may be embodied. In these figures, identical references designate similar elements.

FIGS. 2 to 4 are respectively diagrammatic views from the front, from the side and from underneath a nacelle in accordance with the invention.

DETAILED DESCRIPTION OF THE INVENTION

Figure 1:
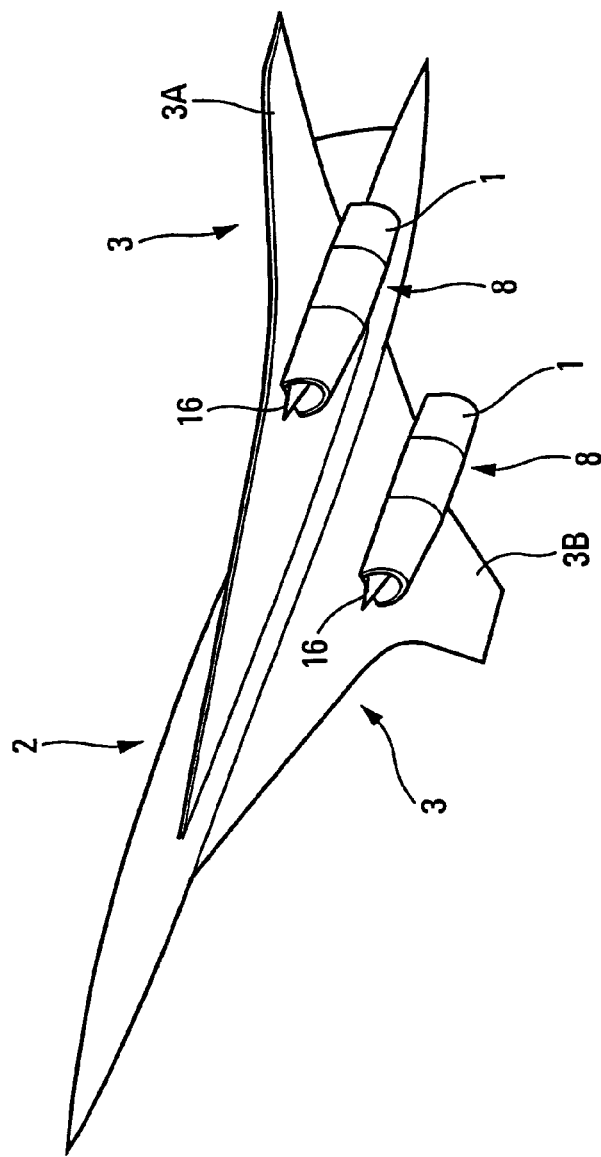
FIG. 1 diagrammatically shows an aircraft furnished with nacelles in accordance with the invention.

The nacelle 1 in accordance with the invention and represented diagrammatically in FIGS. 1 to 4 is a jet engine nacelle for a supersonic aircraft 2, in particular a transport aircraft or a fighter aircraft, which is intended to be mounted directly under the airfoil 3 (wings 3A and 3B) of the aircraft 2, as illustrated in FIG. 1, or on the fuselage of the aircraft 2 (in the case of a three-engine aircraft for example).

Said nacelle 1 which is therefore fixed directly under a wing 3A, 3B or onto the fuselage of the aircraft 2, without the use of a linking mast for example, comprises in standard fashion, as represented in particular in FIG. 3:

a central part 4 with constant cross section S1 specified hereinbelow, said central part 4 comprising in its interior part a jet engine (not represented) which is furnished in standard fashion upstream with a fan;

a part 5 upstream, in the air flow direction E, which is attached to said central part 4 and which comprises an air inlet structure 6 ensuring aerodynamic flow, by transforming the upstream air flow (face 6A), which is supersonic and close to the cruising Mach number of the aircraft 2, into a flow downstream of said air inlet structure 6 (face 6B) which can enter via the fan of the jet engine; and a part 7 downstream, which is also attached to said central part 4 and which exhibits a slightly conical shape, the directrix of which corresponds to the cross section S1 of said central part 4, and which comprises, in its interior part, in particular a nozzle (not represented) for ejection of the air. It is known that, by definition, a conical shape or a cone is a surface which is generated by a moving line passing through a fixed point and standing on a fixed curve or directrix S1.

Said nacelle 1 and the elements that are not represented (jet engine, nozzle, etc.) which are mounted thereon, as well as the means of control of said jet engine, likewise not represented, form a power plant 8 in a standard fashion.

Said power plant 8 comprises, furthermore, a compression ramp 16 which is conical and which is mounted under the wing 3A, 3B or on the fuselage, coaxially with respect to the nacelle 1, at the level of the inlet face 9 of the air inlet structure 6.

According to the invention, said air inlet structure 6 exhibits a complex shape allowing it to go from an elliptical conical cross section S2 specified hereinbelow to the constant cross section S1 of the central part 4, while ensuring aerodynamic continuity.

Figure 2:
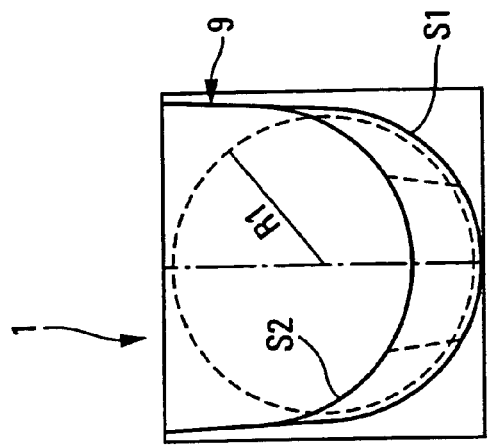

According to the invention, said cross section S1 of the central part 4 exhibits, as illustrated in FIG. 2, a U shape defined (in its lower part) on the basis of an arc of a circle of radius dependent on a predetermined length of radius, namely the length of the radius R1 of the fan of the jet engine (to which is added an auxiliary length allowing the installation of standard systems). The free branches of the U shape of the nacelle 1 are fixed under the corresponding wing 3A, 3B or on the fuselage of the aircraft 2.

Figure 5:
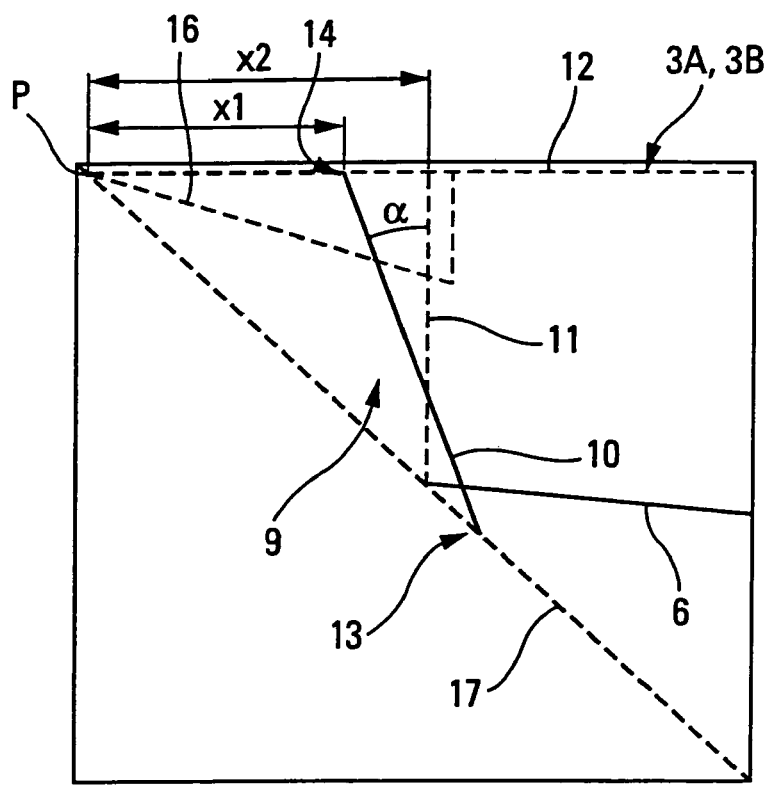
FIGS. 5 and 6 are schematics demonstrating particular characteristics of such a nacelle.

Additionally, according to the invention, the inlet face 9 of the air inlet structure 6 (at the level of the upstream face 6A) exhibits a conical cross section S2 which is elliptical, that is to say which forms an ellipse, and which is defined by the intersection of a conical shock wave 17 (generated by the compression ramp 16) and of a plane 10 represented in FIG. 5. This plane 10 is inclined with respect to a plane 11 which is orthogonal to a mean plane 12 of the wing 3A, 3B or to a longitudinal general direction of the nacelle 1. Moreover, this inclination is such that the free side 13 of said inlet face 9 is set back, in the air inlet direction E with respect to the opposite side 14 intended to face the airfoil 3 (FIGS. 3 and 5) or the fuselage.

Figure 6:
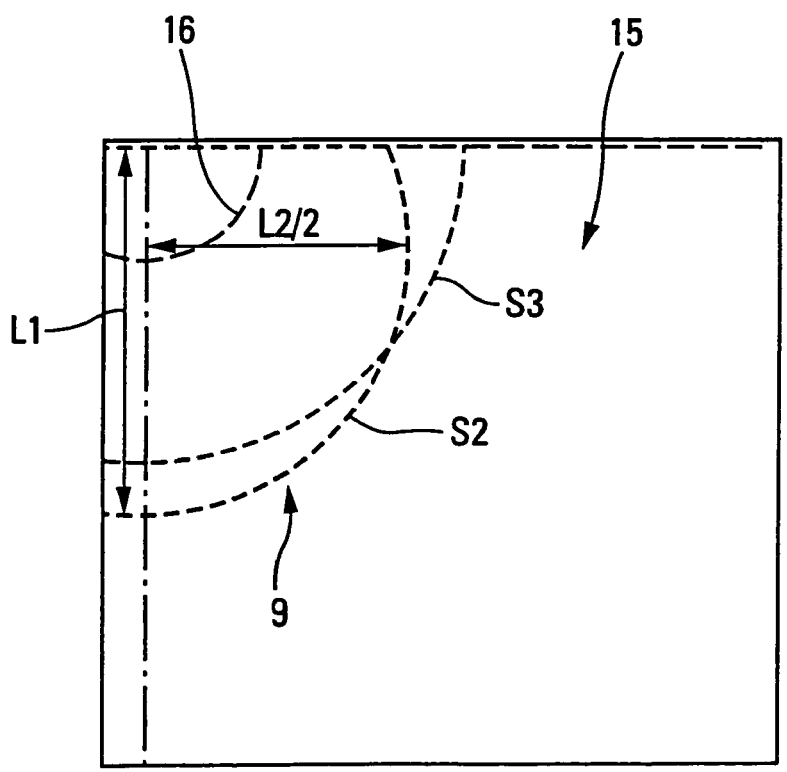

Thus, by virtue of this characteristic (inlet face 9 with elliptical cross section S2), it is possible to increase the length L1 of this inlet face 9 and to reduce its width L2 (with respect to a circular or semicircular inlet face S3, as represented in FIG. 6) in a frontal plane 15 parallel to said plane 11 in such a way as to adapt this inlet face 9 as much as possible to the cross section S1 of the downstream face 6B of said air inlet structure 6 (which is therefore situated facing the fan of the jet engine), thereby making it possible to reduce the disturbance to the air flow through said air inlet structure 6 between its upstream face 6A and its downstream face 6B. Thus, the quality of the air stream passing through said air inlet structure 6 is improved, as is the stability of the latter, and the drag of the nacelle 1 is reduced.

It will furthermore be noted that at reduced speed (at subsonic speed), the area to be taken into account in respect of the air stream is the actual area of the inlet face 9. Now, with an inlet face 9 with elliptical cross section in accordance with the invention, when the frontal area (that is to say parallel to said plane 11 or orthogonal to the general plane 12 of the airfoil 3) of this inlet face 9 is similar to that of a semicircular or circular inlet face for example, its actual area is higher, this being beneficial for the behavior of the air inlet structure 6 during a flight at reduced speed so as to satisfy control commands for the jet engine.

Additionally, as indicated hereinabove, the conical compression ramp 16 generates a compression of the flow upstream of the inlet face 9, which gives rise to the conical shock wave 17, whose vertex is a point P (FIG. 5). It is known that the higher the local Mach number (at the level of the compression ramp 16), the more contracted is the cone of the shock wave 17. The elliptical conical shape S2 of the inlet face 9 allows the jet engine not to ingest this shock wave. It is consequently beneficial to construct said inlet face 9 for a high Mach number which will always be greater than the Mach number at which the aircraft 2 will fly. By way of example, if the aircraft 2 has to fly at a cruising speed of Mach 1.6 so that the local Mach number at the level of the compression ramp 16 is 1.54, it is possible to dimension the inlet face 9 for a Mach number of 1.62 for example. Thus, it is certain that the shock wave will never be ingested by the jet engine. Said shock wave 17 generated by the compression ramp 16 therefore makes it possible to define the shape of the air inlet.

Furthermore, said plane 10 is inclined with respect to said plane 11 by an angle of inclination $\alpha$ which lies between 5° and 30°. Preferably, said angle of inclination $\alpha$ is substantially equal to 20.6°. The best inclination is that which results in the maximum width L2 of the inlet face 9 being as close as possible to the width of the nacelle 1 at the level of the fan (central part 4). Thus, the variation in cross section of the air inlet structure 6 between its upstream face 6A (or inlet face 9) and its downstream face 6B is in particular limited.

On the side 14 of the wing 3A, 3B, the plane 10 is situated at a distance x1 from the point P. The distance x1 may for example be defined so that the inlet face 9 exhibits the same frontal area as a semicircular air inlet face situated at a predetermined distance x2.

The invention claimed is:

1. A power plant for an aircraft having a structure establishing a maximum Mach number at which the aircraft is capable of flying, said power plant comprising:
   at least a jet engine;
   a jet engine nacelle comprising, upstream in the air inlet direction, an air inlet structure provided upstream with an inlet face; and
   a conical compression ramp which is mounted coaxially with respect to the nacelle, at the level of the inlet face of the air inlet structure, wherein:
   said inlet face of the air inlet structure includes an elliptical conical cross section defined by the intersection of (i) a conical shock wave generated by the conical compression ramp for a particular Mach number that is greater than said maximum Mach number at which the aircraft is capable of flying and (ii) a first plane which is inclined with respect to a second plane orthogonal to a longitudinal general direction of the nacelle,
   said first plane is inclined with respect to said second plane by an angle of inclination which is such that the maximum width of the inlet face corresponds to the width of the nacelle at the level of a central part of the nacelle intended to receive a fan,
   the free side of said inlet face is set back, in the air inlet direction, with respect to the opposite side intended to face the aircraft, and
   the inlet face of the air inlet structure having said shape of the elliptical conical cross section causes an actual shock wave generated by the conical compression ramp during flight to not be ingested by the jet engine at any Mach number at which the aircraft is capable of flying.

2. The power plant of claim 1, wherein said first plane is inclined with respect to said second plane by an angle of inclination which lies between 50° and 30 °.

3. The power plant of claim 2, wherein said angle of inclination is substantially equal to 20.6°.

4. The power plant of claim 1, wherein said air inlet structure has a shape going from said elliptical conical cross section to a U-shaped cross section which is defined on the basis of an arc of a circle, whose radius depends on the length of the radius of the fan of the jet engine which will be mounted in said nacelle.

5. A supersonic aircraft, which comprises at least one power plant of the type of that specified under claim 1.

6. A method for designing a power plant for an aircraft having a structure defining a maximum Mach number at which the aircraft is capable of flying, the method comprising:

designing a jet engine nacelle having an air inlet structure with an air inlet face;

designing a conical compression ramp that is coaxial with respect to the nacelle at the level of the inlet face;

designing the inlet face to have an elliptical conical cross section that is defined by the intersection of (i) a conical shock wave generated by the conical compression ramp at a Mach number that is greater than the maximum Mach number at which the aircraft is capable of flying and (ii) a first plane which is inclined with respect to a second plane, which is orthogonal to a longitudinal general direction of the nacelle, wherein:

said first plane is inclined with respect to said second plane by an angle of inclination which is such that the maximum width of the inlet face corresponds to the width of the nacelle at the level of a central part of the nacelle intended to receive a fan, the free side of the inlet face is set back, in the air inlet direction, with respect to the opposite side that faces the aircraft, and the inlet face of the air inlet structure having said shape of the elliptical conical cross section causes an actual shock wave generated by the conical compression ramp during flight to not be ingested by the jet engine at any Mach number at which the aircraft is capable of flying.

7. The method of claim 6, wherein the first plane is inclined with respect to the second plane by an angle of inclination which lies between 5° and 30°.

8. The method of claim 7, wherein the angle of inclination is substantially equal to 20.6°.

9. The method of claim 6 further comprising designing the air inlet structure with a shape going from an said elliptical conical cross section to a U-shaped cross section defined on the basis of an arc of a circle whose radius depends on the length of the radius of the fan.

* * * * *